(12) United States Patent
Bohra et al.

(10) Patent No.: US 9,594,423 B1
(45) Date of Patent: Mar. 14, 2017

(54) APPARATUS, SYSTEM, AND METHOD FOR IMPROVING THE ENERGY EFFICIENCY OF ROUTERS

(71) Applicant: Juniper Networks, Inc., Sunnyvale, CA (US)

(72) Inventors: Amit Bohra, Aligarh (IN); Khalid Akhtar Ansari, Bangalore (IN); Vinod Ponnappan, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 67 days.

(21) Appl. No.: 14/589,724

(22) Filed: Jan. 5, 2015

(51) Int. Cl.
| | |
|---|---|
| *G06F 1/00* | (2006.01) |
| *G06F 1/32* | (2006.01) |
| *H04L 12/24* | (2006.01) |
| *H04L 29/08* | (2006.01) |
| *H04W 52/02* | (2009.01) |

(52) U.S. Cl.
CPC .......... *G06F 1/3287* (2013.01); *G06F 1/3296* (2013.01); *H04L 41/0803* (2013.01); *H04L 67/22* (2013.01); *H04W 52/02* (2013.01); *H04W 52/0258* (2013.01)

(58) Field of Classification Search
CPC .. H04W 52/02; H04W 52/0258; H04L 67/22; H04L 41/0803; G06F 1/3296; G06F 1/3287
See application file for complete search history.

(56) References Cited

U.S. PATENT DOCUMENTS

| | | | |
|---|---|---|---|
| 6,366,143 B1* | 4/2002 | Liu | H04L 12/10 327/142 |
| 7,336,605 B2 | 2/2008 | Bruckman et al. | |
| 8,077,613 B2 | 12/2011 | Bitar | |
| 8,448,006 B2 | 5/2013 | Floyd et al. | |
| 2008/0089236 A1 | 4/2008 | Kotria et al. | |
| 2008/0214140 A1* | 9/2008 | Caveney | H04L 12/66 455/402 |
| 2008/0240133 A1 | 10/2008 | Tanaka | |
| 2008/0304519 A1 | 12/2008 | Koenen et al. | |

(Continued)

OTHER PUBLICATIONS

Janssen, Cory "Link Aggregation (LAG)", http://www.techopedia.com/definition/24969/link-aggregation-lag, as accessed on Jan. 21, 2015, Techopedia, (Nov. 2011).

(Continued)

*Primary Examiner* — Xuxing Chen
(74) *Attorney, Agent, or Firm* — FisherBroyles, LLP (57) ABSTRACT

The disclosed apparatus may include a set of router components that are consuming electrical power in connection with a router that facilitates network traffic within a network. The apparatus may also include a power-optimization unit communicatively coupled to the set of router components. The power-optimization unit may detect at least one router component included in the set of router components that is not currently being used by the router to facilitate the network traffic within the network. In response to detecting the router component that is not currently being used by the router, the power-optimization unit may shut off the router component such that the router component no longer consumes electrical power in connection with the router. Various other apparatuses, systems, and methods are also disclosed.

20 Claims, 5 Drawing Sheets

(56) References Cited

U.S. PATENT DOCUMENTS

2009/0141622 A1    6/2009  Bitar
2011/0283116 A1*  11/2011  Ban .................... G06F 3/0625
                                                713/300
2012/0191998 A1*   7/2012  Tazebay ............... H04L 12/12
                                                713/323
2013/0243007 A1*   9/2013  Ding .................. H04L 47/58
                                                370/412

OTHER PUBLICATIONS

Ravindranath C Kanakarajan, et al; Apparatus, System, and Method for Improving the Energy Efficiency of Link Aggregation Groups; U.S. Appl. No. 14/634,587, filed Feb. 27, 2015.

Rahul Kulkarni, et al; System, Method, and Apparatus for Detecting Fault Conditions Experienced by Remote Physical Ports; U.S. Appl. No. 14/265,321, filed Apr. 29, 2014.

Amit Bohra, et al; Apparatus, System, and Method for Improving the Energy Efficiency of Routers; U.S. Appl. No. 15/417,187, filed Jan. 26, 2017.

* cited by examiner

Apparatus 100

APPARATUS, SYSTEM, AND METHOD FOR IMPROVING THE ENERGY EFFICIENCY OF ROUTERS

BACKGROUND

Many service providers are concerned about the financial and/or environmental implications of their electrical power consumption. One of the primary sources of many service providers' electrical power consumption is routers. Routers are often used by service providers to facilitate and/or direct the flow of network traffic within their networks.

Conventional routers may include various components that consume electrical power. For example, a conventional router may include one or more Field Replaceable Units (FRUs), Physical Interface Cards (PICs), and/or Flexible PIC Concentrators (FPCs) that enable the router to facilitate and/or direct network traffic within a service provider's network. In this example, the FRUs, PICs, and/or FPCs may consume electrical power even when they are not necessarily being used by the conventional router to facilitate and/or direct network traffic. As a result, these conventional routers may potentially lead to high energy costs and/or negative environmental impact.

The instant disclosure, therefore, identifies and addresses a need for apparatuses, systems, and methods for improving the energy efficiency of routers.

SUMMARY

As will be described in greater detail below, the instant disclosure generally relates to apparatuses, systems, and methods for improving the energy efficiency of routers. In one example, an apparatus for accomplishing such a task may include a set of router components one example, an apparatus for accomplishing such a task may include a set of router components that are consuming electrical power in connection with a router that facilitates network traffic within a network. The apparatus may also include a power-optimization unit communicatively coupled to the set of router components. The power-optimization unit may detect at least one router component included in the set of router components that is not currently being used by the router to facilitate the network traffic within the network. In response to detecting the router component that is not currently being used by the router, the power-optimization unit may shut off the router component such that the router component no longer consumes electrical power in connection with the router.

Similarly, a router incorporating the above-described apparatus may include a set of Field Replaceable Units (FRUs) that enable the router to facilitate network traffic within a network and consume electrical power in connection with facilitating the network traffic within the network. The router may also include a power-optimization unit that detects at least a portion of an FRU included in the set of FRUs that is not currently being used by the router to facilitate the network traffic within the network. In response to detecting the portion of the FRU that is not currently being used by the router, the power-optimization unit may shut off the portion of the FRU such that the portion of the FRU no longer consumes electrical power in connection with the router.

A corresponding method may include identifying a set of router components that are consuming electrical power in connection with a router that facilitates network traffic within a network. The method may also include detecting at least one router component included in the set of router components that is not currently being used by the router to facilitate the network traffic within the network. The method may further include shutting off, in response to detecting the router component that is not currently being used by the router, the router component such that the router component no longer consumes electrical power in connection with the router.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for improving the energy efficiency of routers. As will be explained in greater detail below, by identifying the highest level within a router component hierarchy that is not being used by the router and then powering down all of the router components (such as FRUs, FPCs, PICs, and/or individual communication ports) corresponding to that level within the router component hierarchy, embodiments of the instant disclosure may help optimize the amount of electrical power used by the router. Moreover, by optimizing the amount of power used by the router in this way, embodiments of the instant disclosure may enable router customers to save on operating costs that stem from operating the router and/or to decrease their impact on the environment.

The term "Field Replaceable Unit" and the abbreviation "FRU," as used herein, generally refer to any type or form of circuit that is removable from a router by a user in the field. In some examples, FRUs may be hot-removable, hot-insertable, and/or hot-pluggable. Examples of FRUs include, without limitation, power supplies, uplink modules, transceivers, fan trays, FPCs, PICs, packet forwarding engines, routing engines, switching modules, variations of one or more of the same, combinations of one or more of the same, or any other suitable FRUs.

The term "Physical Interface Card" and the abbreviation "PIC," as used herein, generally refer to any type or form of generally refer to any type or form of interface-specific card, blade, and/or module that includes a plurality of physical communication ports. The term "Flexible PIC Concentrator" and the abbreviation "FPC," as used herein, generally refer to any type or form of circuit that supports and/or houses a plurality of PICs within a router.

The term "communication port," as used herein, generally refers to any type or form of physical interface, device, and/or housing that forms at least a portion of a connection and/or link within a network. Examples of communication ports include, without limitation, Quad Small Form-factor Pluggable (QSFP) ports, Ethernet ports, Fibre Channel ports, optical ports, InfiniBand ports, CXP connectors, Multiple-Fiber Push-On/Pull-Off (MPO) connectors, XAUI ports, XFP transceivers, XFI interfaces, C Form-factor Pluggable (CFP) transceivers, variations of one or more of the same, combinations of one or more of the same, or any other suitable communication ports.

Figure 1:
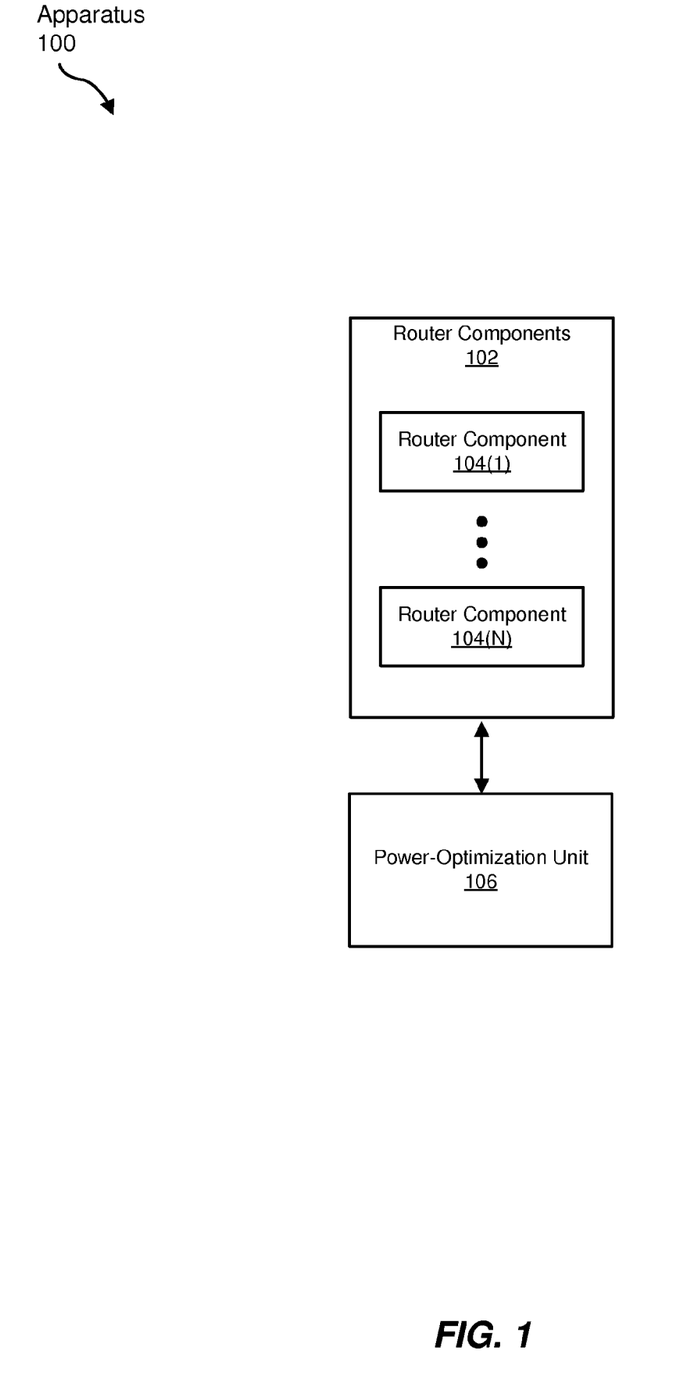
FIG. 1 is a block diagram of an exemplary apparatus for improving the energy efficiency of routers.

The following will provide, with reference to FIG. 1, examples of apparatuses that improve the energy efficiency of routers. The discussion corresponding to FIG. 2 will provide a detailed description of an exemplary implementation of an apparatus that improves the energy efficiency of routers. The discussion corresponding to FIG. 3 will provide a detailed description of an exemplary notification indicating that a router component has been shut off. The discussion corresponding to FIG. 4 will provide a detailed description of an exemplary method for improving the energy efficiency of routers. Finally, the discussion corresponding to FIG. 5 will provide numerous examples of systems that may include the apparatus shown in FIG. 1.

FIG. 1 shows a block diagram of an exemplary apparatus 100 for improving the energy efficiency of routers. The term "energy efficiency," as used herein, generally refers to the amount and/or level of electrical power consumed by a router during operation. In one example, a router may facilitate and/or direct the flow of network traffic within a network. In this example, the energy efficiency of a router may represent the amount of electrical power consumed by the router while facilitating and/or directing the flow of network traffic.

As illustrated in FIG. 1, apparatus 100 may include a power-optimization unit 106 in communication with a set of router components 102. The term "power-optimization unit," as used herein, generally refers to any type or form of physical hardware, circuit, device, and/or processor that performs certain Input/Output (I/O) operations and/or computing tasks directed to optimizing the electrical power consumption of a router. In one example, power-optimization unit 106 may represent an integrated circuit whose configuration and/or infrastructure is at least partially fixed. Additionally or alternatively, power-optimization unit 106 may represent an integrated circuit whose configuration and/or infrastructure is at least partially variable and/or programmable. Examples of power-optimization unit 106 include, without limitation, Field-Programmable Gate Arrays (FPGAs), Central Processing Units (CPUs), processors, microprocessors, microcontrollers, Application-Specific Integrated Circuits (ASICs), software modules installed one or more of the same, portions of one or more of the same, variations of one or more of the same, combinations of one or more of the same, or any other suitable power-optimization unit.

In some examples, set of router components 102 may include router components 104(1)-(N) that consume electrical power in connection with a router that facilitates and/or directs the flow of network traffic within a network. The term "router component," as used herein, generally refers to any type or form of device, system, and/or mechanism capable of consuming electrical power and/or enabling a router to facilitate network traffic within a network. In one example, router components 104(1)-(N) may each be able to perform one or more networking functions (e.g., receiving, transmitting, forwarding, transferring, and/or carrying data packets) within a router and/or across a network. In this example, router components 104(1)-(N) may each need to consume electrical power to perform such networking functions. Examples of router components 104(1)-(N) include, without limitation, FRUs, FPCs, PICs, communication ports, variations of one or more of the same, combinations of one or more of the same, or any other suitable router components.

In some examples, power-optimization unit 106 may be communicatively coupled to set of router components 102. In such examples, power-optimization unit 106 may detect one or more of router components 102 that are not currently being used by the router to facilitate the network traffic within the network. For example, power-optimization unit 106 may determine that router component 104(1) is not currently being used by the router to facilitate the network traffic within the network. Additionally or alternatively, power-optimization unit 106 may determine that router component 104(N) is not currently being used by the router to facilitate the network traffic within the network.

As a specific example, power-optimization unit 106 may detect an FPC that is not currently being used by the router to facilitate the network traffic within the network. For example, power-optimization unit 106 may determine that no PICs are currently connected to and/or installed in the FPC. As a result, the FPC may be unable to facilitate any network traffic. In this example, power-optimization unit 106 may determine that the FPC is not currently being used by the router to facilitate the network traffic since no PICs are currently connected to and/or installed in the FPC.

As another example, power-optimization unit 106 may detect a PIC that is not currently being used by the router to facilitate the network traffic within the network. For example, power-optimization unit 106 may determine that the FPC includes a PIC whose communication ports are not currently being used by the router to facilitate the network traffic within the network. In other words, power-optimization unit 106 may determine that none of the PIC's communication ports are currently receiving, transmitting, forwarding, transferring, and/or carrying data packets. In this example, power-optimization unit 106 may determine that the PIC is not currently being used by the router to facilitate the network traffic since none of the PIC's communication ports are currently being used by the router to facilitate the network traffic.

In one example, power-optimization unit 106 may determine that none of the PIC's communication ports are currently being used by the router to facilitate the network traffic based at least in part on whether any fiber optic cables are currently connected to the PIC's communication ports. For example, power-optimization unit 106 may determine that no fiber optic cables are currently connected to any of the PIC's communication ports. In this example, power-optimization unit 106 may determine that the PIC's communication ports are not currently being used by the router since no fiber optic cables are currently connected to any of the PIC's communication ports.

In another example, power-optimization unit 106 may determine that none of the PIC's communication ports are currently being used by the router to facilitate the network traffic based at least in part on whether network traffic is travelling on any fiber optic cables connected to the PIC's communication ports. For example, power-optimization unit 106 may determine that no network traffic is currently travelling on any fiber optic cables connected to the PIC's communication ports. In this example, power-optimization unit 106 may determine that the PIC's communication ports are not currently being used by the router since no network traffic is currently travelling on any fiber optic cables connected to the PIC's communication ports.

As a further example, power-optimization unit 106 may detect an individual communication port of a PIC that is not currently being used by the router to facilitate the network traffic within the network. For example, power-optimization unit 106 may determine that no fiber optic cables are currently connected to the individual communication port of the PIC. As a result, the individual communication port may be unable to facilitate any network traffic. In this example, power-optimization unit 106 may determine that the individual communication port is not currently being used by the router to facilitate the network traffic since no fiber optic cables are currently connected to the individual communication port of the PIC.

In some examples, power-optimization unit 106 may shut off one or more of router components 102 in response to detecting one or more of router components 102 that are not currently being used by the router to facilitate the network traffic within the network. For example, power-optimization unit 106 may shut off router component 104(1) in response to determining that router component 104(1) is not currently being used by the router to facilitate the network traffic within the network. Additionally or alternatively, power-optimization unit 106 may shut off router component 104(N) in response to determining that router component 104(N) is not currently being used by the router to facilitate the network traffic within the network.

The phrase "shut off," as used herein, generally refers to any act and/or process of turning off and/or powering down a router component such that the router component no longer consumes electrical power. In various examples, power-optimization unit off router component 104(1) without shutting off router component 104(N). As a result, router component 104(N) may still consume electrical power and/or function properly in connection with the router. Accordingly, the router may continue to facilitate network traffic within the network even after power-optimization unit 106 shuts off router component 104(1).

As a specific example, power-optimization unit 106 may shut off an FPC in the event that no PICs are currently connected to the FPC. As another example, power-optimization unit 106 may shut off a PIC whose communication ports are not currently being used by the router to facilitate the network traffic within the network. As a further example, power-optimization unit 106 may shut off an individual communication port that is not currently carrying any network traffic within the network.

Figure 2:
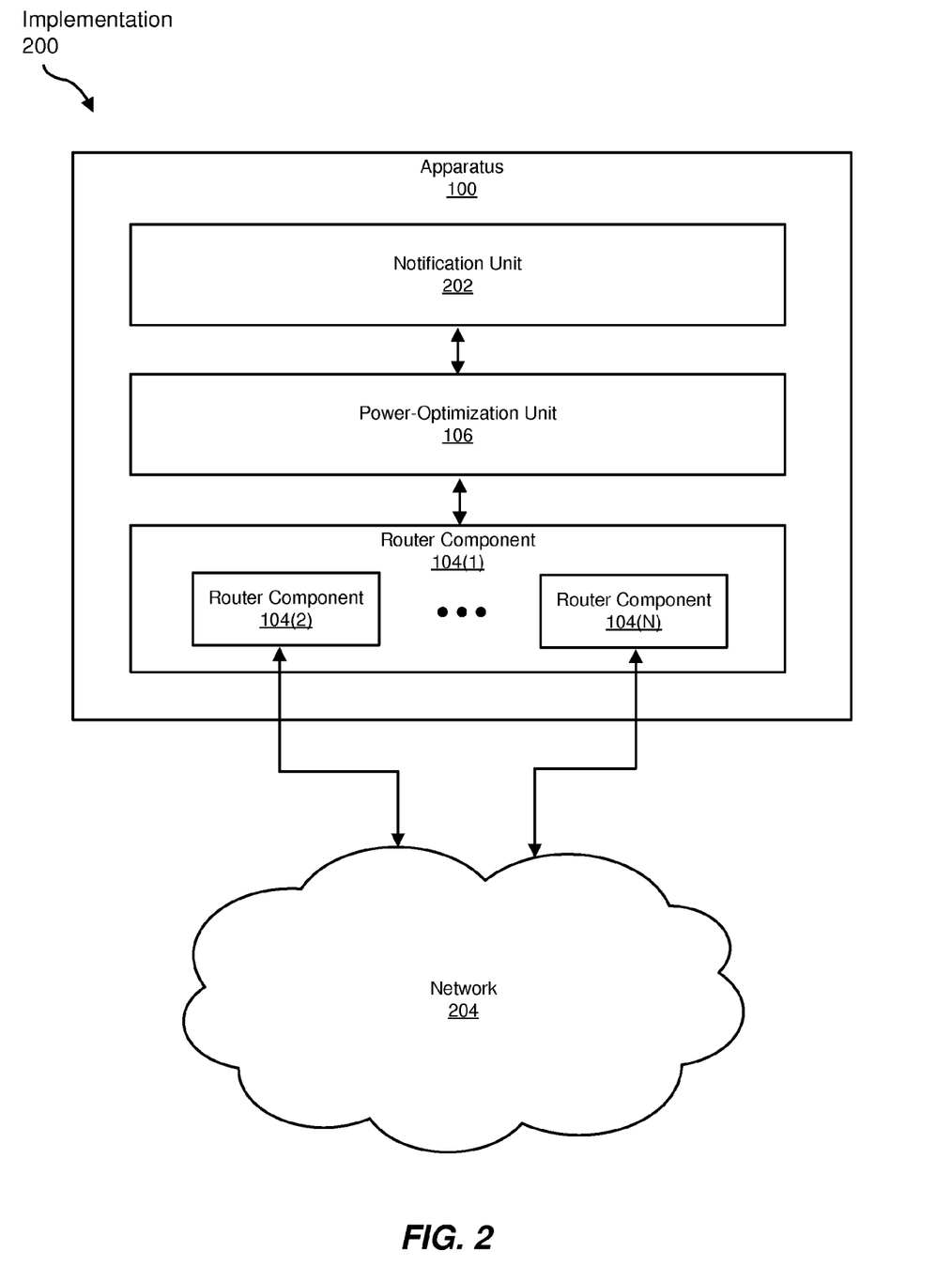
FIG. 2 is a block diagram of an exemplary implementation of an apparatus for improving the energy efficiency of routers.

FIG. 2 shows a block diagram of an exemplary implementation 200 of apparatus 100 for improving the energy efficiency of routers. As illustrated in FIG. 2, implementation 200 may include apparatus 100 in communication with a network 204. The term "network," as used herein, generally refers to any type or form of medium and/or architecture that facilitates communication or data transfer. In one example, network 204 may include and/or represent a plurality of computing devices. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations of one or more of the same, combinations of one or more of the same, or any other suitable network. Network 204 may facilitate communication or data transfer using wireless or wired connections.

As illustrated in FIG. 2, apparatus 100 may include a notification unit 202, power-optimization unit 106, and router components 104(1) and 104(2)-(N). The term "notification unit," as used herein, generally refers to any type or form of physical hardware, circuit, device, and/or processor that performs certain I/O operations and/or computing tasks directed to notifying a user of a router about certain issues related to the router. In one example, notification unit 202 may represent an integrated circuit whose configuration and/or infrastructure is at least partially fixed. Additionally or alternatively, notification unit 202 may represent an integrated circuit whose configuration and/or infrastructure is at least partially variable and/or programmable. Examples of notification unit 202 include, without limitation, FPGAs, CPUs, processors, microprocessors, microcontrollers, ASICs, software modules installed one or more of the same, portions of one or more of the same, variations of one or more of the same, combinations of one or more of the same, or any other suitable notification unit.

In one example, power-optimization unit 106 may identify a hierarchy of router components that includes an upper hierarchical level and a lower hierarchical level. In this example, the upper hierarchical level may include and/or represent router component 104(1) in FIG. 2 that includes and/or controls set of router components 104(2)-(N) in FIG. 2. Additionally or alternatively, the lower hierarchical level may include and/or represent set of router components 104(2)-(N) in FIG. 2 included in and/or controlled by router component 104(1) in FIG. 2. components 104(2)-(N) in FIG. 2 included in and/or controlled by router component 104(1) in FIG. 2.

In one example, power-optimization unit 106 may determine that none of set of router components 104(2)-(N) in FIG. 2 included in and/or controlled by router component 104(1) in FIG. 2 are currently being used by the router to facilitate the network traffic within the network. In this example, power-optimization unit 106 may shut off the upper hierarchical level and the lower hierarchical level within the hierarchy of router components in response to determining that none of set of router components 104(2)-(N) in FIG. 2 are currently being used by the router to facilitate the network traffic. By shutting off the upper hierarchical level and the lower hierarchical level, power-optimization unit 106 may ensure that router component 104(1) and set of router components 104(2)-(N) in FIG. 2 no longer consume electrical power in connection with the router.

As a specific example, an upper hierarchical level may include and/or represent a FPC that includes and/or controls a plurality of PICs. Additionally or alternatively, a lower hierarchical level may include and/or represent the plurality of PICs included in and/or controlled by the FPC. In this example, power-optimization unit 106 may determine that none of the PICs included in and/or controlled by the FPC are currently being used by the router. As a result, power-optimization unit 106 may shut off the upper hierarchical level and the lower hierarchical level such that the FPC and the PICs no longer consume electrical power in connection with the router.

As another example, an upper hierarchical level may include and/or represent a PIC that includes and/or controls a plurality of communication ports. Additionally or alternatively, a lower hierarchical level may include and/or represent the plurality of communication ports included in and/or controlled by the PIC. In this example, power-optimization unit 106 may determine that none of the communication ports included in and/or controlled by the PIC are currently being used by the router. As a result, power-optimization unit 106 may shut off the upper hierarchical level and the lower hierarchical level such that the PIC and the communication ports no longer consume electrical power in connection with the router.

Figure 3:
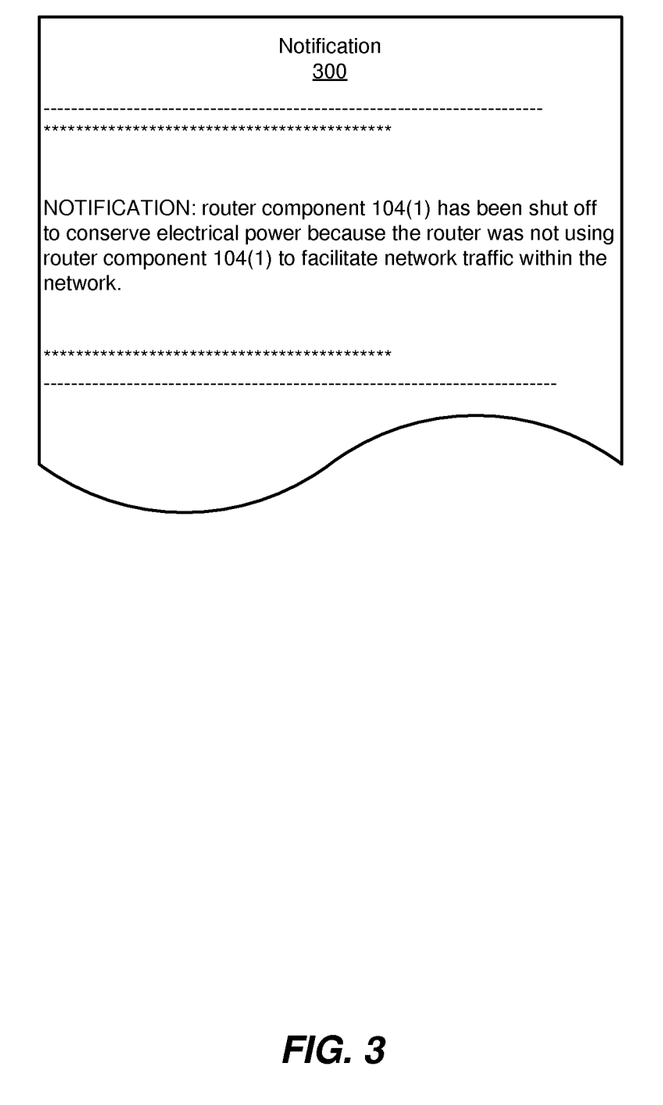
FIG. 3 is an illustration of an exemplary notification indicating that a router component has been shut off.

In one example, notification unit 202 in FIG. 2 may be communicatively coupled to power-optimization unit 106 in FIG. 2. In this example, notification unit 202 may issue a notification indicating that the router component has been shut off due at least in part to the router component not being used by the router to facilitate the network traffic within the network. For example, notification unit 202 may issue notification 300 in FIG. 3. As illustrated in FIG. 3, notification 300 may indicate that a router component has been shut off (in this example, "router component 104(1) has been shut off to conserve electrical power because the router was not using router component 104(1) to facilitate network traffic within the network"). Upon issuance, notification 300 may be presented to a user of the router via a display and/or monitor.

Figure 4:
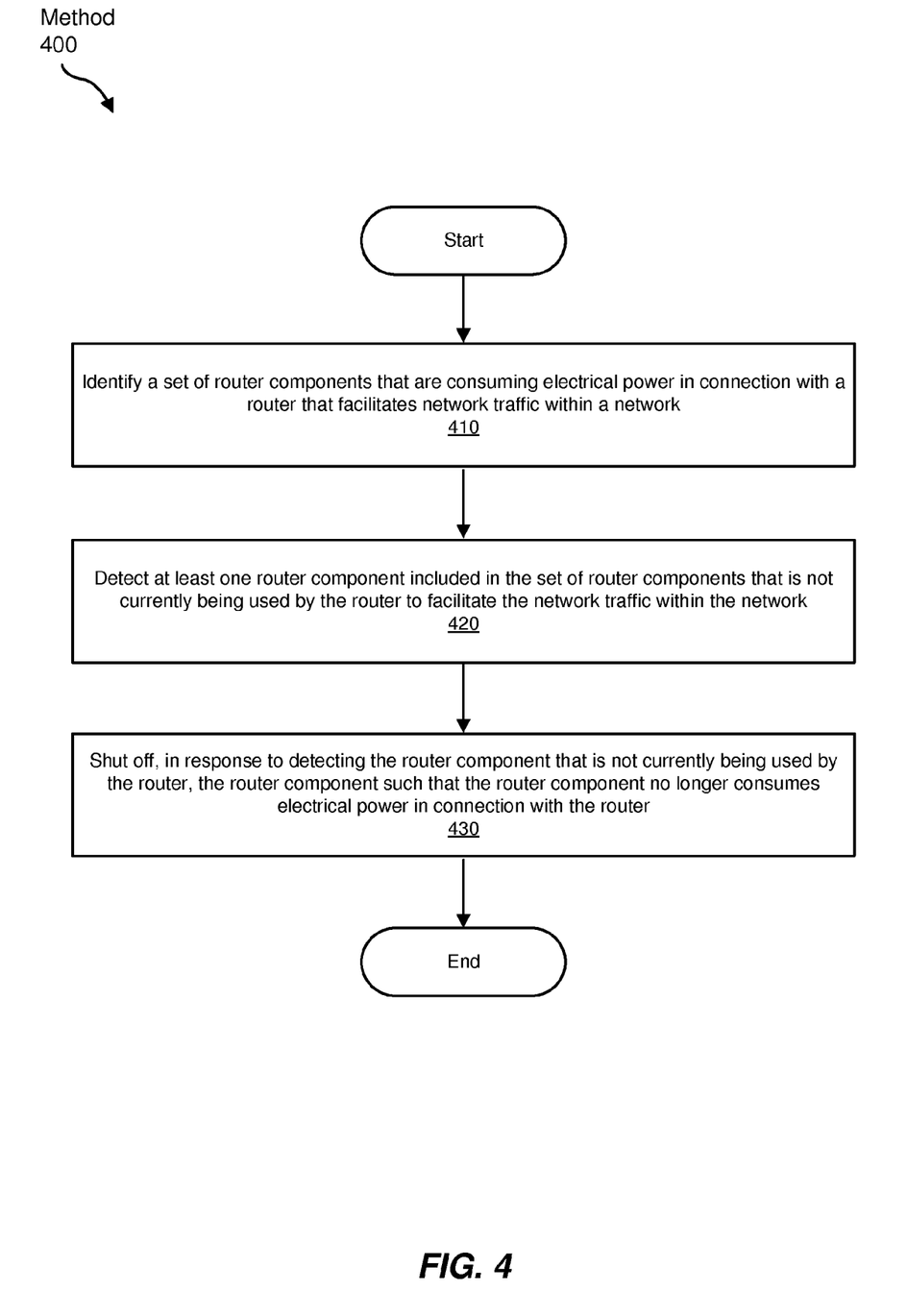
FIG. 4 is a flow diagram of an exemplary method for improving the energy efficiency of routers.

FIG. 4 is a flow diagram of an exemplary method 400 for improving the energy efficiency of routers. Method 400 may include the step of identifying a set of router components that are consuming electrical power in connection with a router that facilitates network traffic within a network (410). This identifying step may be performed in a variety of ways. For example, power-optimization unit 106 may, as part of a router, identify set of router components 104(1)-(N) by enumerating all of the router components in connection with the router. Additionally or alternatively, power-optimization unit 106 may identify set of router components 104(1)-(N) by probing the router components to determine which router components are powered-on.

Returning to FIG. 4, method 400 may also include the step of detecting at least one router component included in the set of router components that is not currently being used by the router to facilitate the network traffic within the network (420). This detecting step may be performed in a variety of ways. For example, power-optimization unit 106 may, as part of the router, determine that at least one sub-component required for operation is not currently connected to and/or installed in router component 104(1). Additionally or alternatively, power-optimization unit 106 may determine that no network traffic is currently travelling on router component 104(1).

Returning to FIG. 4, method 400 may additionally include the step of shutting off, in response to detecting the router component that is not currently being used by the router, the router component such that the router component no longer consumes electrical power in connection with the router (430). This shutting-off step may be performed in a variety of ways. For example, power-optimization unit 106 may, as part of the router, stop the electrical power from flowing to router component 104(1). Additionally or alternatively, power-optimization unit 106 may direct router component 104(1) to power down.

Figure 5:
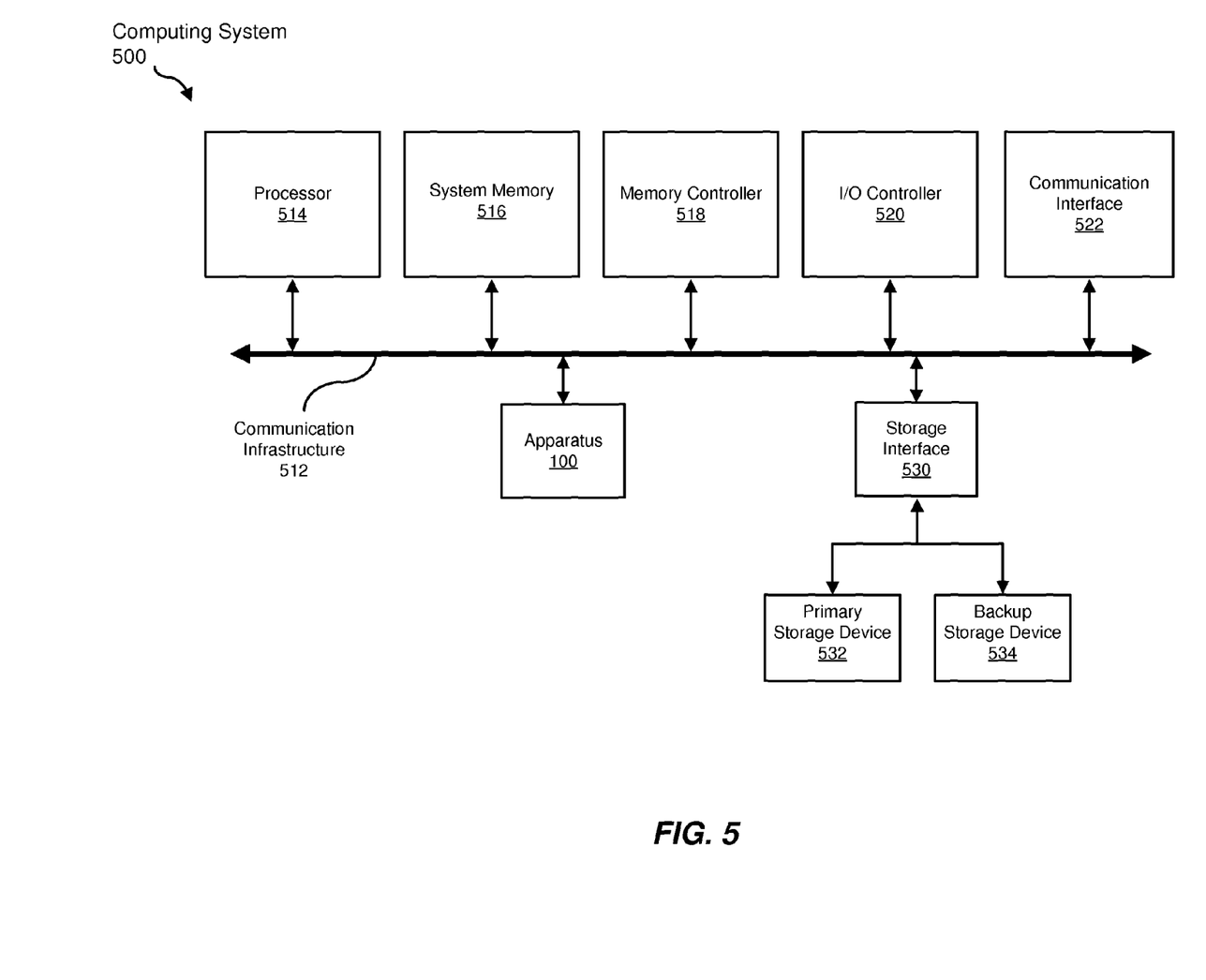
FIG. 5 is a block diagram of an exemplary computing system capable of implementing and/or being used in connection with one or more of the embodiments described and/or illustrated herein.

FIG. 5 is a block diagram of an exemplary computing system 500 capable of implementing and/or being used in connection with one or more of the embodiments described and/or illustrated herein. In some embodiments, all or a portion of computing system 500 may perform and/or be a means for performing, either alone or in combination with other elements, one or more of the steps described in connection with FIG. 4. All or a portion of computing system 500 may also perform and/or be a means for performing and/or implementing any other steps, methods, or processes described and/or illustrated herein. In one example, computing system 500 may include apparatus 100 from FIG. 1.

Computing system 500 broadly represents any type or form of electrical load, including a single or multi-processor computing device or system capable of executing computer-readable instructions. Examples of computing system 500 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 500 may be programmed, configured, and/or otherwise designed to comply with one or more networking protocols. According to certain embodiments, computing system 500 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 500 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 500 may include various network and/or computing components. For example, computing system 500 may include at least one processor 514 and a system memory 516. Processor 514 generally represents any type or form of processing unit capable of processing data or interpreting and executing instructions. For example, processor 514 may represent an application-specific integrated circuit (ASIC), a system on a chip (e.g., a network processor), a hardware accelerator, a general purpose processor, and/or any other suitable processing element.

Processor 514 may process data according to one or more of the networking protocols discussed above. For example, processor 514 may execute or implement a portion of a protocol stack, may process packets, may perform memory operations (e.g., queuing packets for later processing), may execute end-user applications, and/or may perform any other processing tasks.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 500 may include both a volatile memory unit (such as, for example, system memory 516) and a non-volatile storage device (such as, for example, primary storage device 532, as described in detail below). System memory 516 may be implemented as shared memory and/or distributed memory in a network device. Furthermore, system memory 516 may store packets and/or other information used in networking operations.

In certain embodiments, exemplary computing system 500 may also include one or more components or elements in addition to processor 514 and system memory 516. For example, as illustrated in FIG. 5, computing system 500 may include a memory controller 518, an Input/Output (I/O) controller 520, and a communication interface 522, each of which may be interconnected via communication infrastructure 512. Communication infrastructure 512 generally represents any type or form of infrastructure capable of facilitating communication between one or more components of a computing device. Examples of communication infrastructure 512 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 518 generally represents any type or form of device capable of handling memory or data or controlling communication between one or more components of computing system 500. For example, in certain embodiments memory controller 518 may control communication between processor 514, system memory 516, and I/O controller 520 via communication infrastructure 512. In some embodiments, memory controller 518 may include a Direct Memory Access (DMA) unit that may transfer data (e.g., packets) to or from a link adapter.

I/O controller 520 generally represents any type or form of device or module capable of coordinating and/or controlling the input and output functions of a computing device. For example, in certain embodiments I/O controller 520 may control or facilitate transfer of data between one or more elements of computing system 500, such as processor 514, system memory 516, communication interface 522, and storage interface 530.

Communication interface 522 broadly represents any type or form of communication device or adapter capable of facilitating communication between exemplary computing system 500 and one or more additional devices. For example, in certain embodiments communication interface 522 may facilitate communication between computing system 500 and a private or public network including additional computing systems. Examples of communication interface 522 include, without limitation, a link adapter, a wired network interface (such as a network interface card), a wireless network interface (such as a wireless network interface card), and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 522 may also represent a host adapter configured to facilitate communication between computing system 500 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also enable computing system 500 to engage in distributed or remote computing. For example, communication interface 522 may receive instructions from a remote device or send instructions to a remote device for execution.

As illustrated in FIG. 5, exemplary computing system 500 may also include a primary storage device 532 and/or a backup storage device 534 coupled to communication infrastructure 512 via a storage interface 530. Storage devices 532 and 534 generally represent any type or form of storage device or medium capable of storing data and/or other computer-readable instructions. For example, storage devices 532 and 534 may represent a magnetic disk drive (e.g., a so-called hard drive), a solid state drive, a floppy disk drive, a magnetic tape drive, an optical disk drive, a flash drive, or the like. Storage interface 530 generally represents any type or form of interface or device for transferring data between storage devices 532 and 534 and other components of computing system 500.

In certain embodiments, storage devices 532 and 534 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 534 may also include other similar structures or devices for allowing computer software, data, or other computer-readable instructions to be loaded into computing system 500. For example, storage devices 532 and 534 may be configured to read and write software, data, or other computer-readable information. Storage devices 532 and 534 may be a part of computing system 500 or may be separate devices accessed through other interface systems.

Many other devices or subsystems may be connected to computing system 500. Conversely, all of the components and devices illustrated in FIG. 5 need not be present to practice the embodiments described and/or illustrated herein. The devices and subsystems referenced above may also be interconnected in different ways from those shown in FIG. 5. Computing system 500 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of apparatus 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. For example, one or more of the modules recited herein may receive data to be transformed, transform the data, output a result of the transformation to detect at least one router component not being used by a router, use the result of the transformation to shut off the router component, and store the result of the transformation for future use. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
    a set of physical router components that are consuming electrical power in connection with a router that facilitates network traffic within a network; and
    a power-optimization unit communicatively coupled to the set of physical router components, wherein the power-optimization unit:
        identifies a hierarchy of the physical router components that comprises:
            an upper hierarchical level that represents a Physical Interface Card (PIC); and
            a lower hierarchical level that represents a set of physical communication ports included on the PIC; and
        determines that none of the set of physical communication ports included on the PIC are currently being used by the router to facilitate the network traffic within the network; and
        shuts off, in response to determining that none of the set of physical communication ports are currently being used by the router to facilitate the network traffic, the set of physical communication ports and the PIC such that the set of physical communication ports and the PIC no longer consume electrical power in connection with the router.

2. The apparatus of claim 1, wherein the set of physical router components further comprises at least one of:
    another PIC;
    a Flexible PIC Concentrator (FPC); and
    a Field Replaceable Unit (FRU).

3. The apparatus of claim 1, wherein the power-optimization unit further:
    determines that the hierarchy of physical router components further comprises:
        another upper hierarchical level representative of an upper router component that includes a set of lower router components; and
        another lower hierarchical level representative of the set of lower router components included in the upper router component; and
    determines that none of the set of lower router components included in the other upper router component are currently being used by the router to facilitate the network traffic within the network.

4. The apparatus of claim 3, wherein the power-optimization unit shuts off, in response to determining that none of the set of lower router components are currently being used by the router to facilitate the network traffic, the other upper hierarchical level and the other lower hierarchical level within the hierarchy of physical router components such that the upper router component and the set of lower router components no longer consume electrical power in connection with the router.

5. The apparatus of claim 1, further comprising a notification unit that issues, for presentation to a user of the router, a notification indicating that the set of physical communication ports and the PIC have been shut off due at least in part to the set of physical communication ports not being used by the router to facilitate the network traffic within the network.

6. The apparatus of claim 1, wherein:
the set of physical router components comprises a Flexible PIC Concentrator (FPC); and
the power-optimization unit further:
    determines that no PICs are currently connected to the FPC; and
    shuts off the FPC in response to determining that no PICs are currently connected to the FPC.

7. The apparatus of claim 1, wherein:
the set of physical router comprises a Flexible PIC Concentrator (FPC); and
the power-optimization unit further:
    determines that the PIC is connected to the FPC; and
    shuts off the PIC in response to determining that the physical communication ports included on the PIC are not currently being used by the router to facilitate the network traffic within the network.

8. The apparatus of claim 7, wherein the power-optimization unit further:
    determines that no fiber optic cables are currently connected to the physical communication ports included on the PIC; and
    determines, due at least in part to no fiber optic cables currently being connected to the physical communication ports included on the PIC, that the physical communication ports included on the PIC are not currently being used by the router.

9. The apparatus of claim 7, wherein the power-optimization unit further:
    determines that no network traffic is travelling on any fiber optic cables connected to the physical communication ports included on the PIC; and
    determines, due at least in part to no network traffic travelling on any fiber optic cables connected to the physical communication ports included on the PIC, that the physical communication ports included on the PIC are not currently being used by the router.

10. The apparatus of claim 1, wherein the power-optimization unit:
    determines that no fiber optic cables are currently connected to another communication port included on another PIC; and
    shuts off the other communication port included on the other PIC in response to determining that no fiber optic cables are currently connected to the other communication port included on the other PIC.

11. A router comprising:
a set of Field Replaceable Units (FRUs) that:
    enable the router to facilitate network traffic within a network; and
    consume electrical power in connection with facilitating the network traffic within the network, wherein the set of FRUs comprises:
        a Physical Interface Card (PIC); and
        a set of physical communication ports included on the PIC; and
a power-optimization unit that:
    determines that none of the set of physical communication ports included on the PIC are currently being used by the router to facilitate the network traffic within the network; and
    shuts off, in response to determining that none of the set of physical communication ports are currently being used by the router to facilitate the network traffic, the set of physical communication ports and the PIC such that the set of physical communication ports and the PIC no longer consume electrical power in connection with the router.

12. The router of claim 11, wherein the set of FRUs comprises a Flexible PIC Concentrator (FPC).

13. The router of claim 11, wherein the power-optimization unit further:
    identifies a hierarchy of FRUs that comprises:
        an upper hierarchical level representative of an upper FRU that includes a set of lower FRUs; and
        a lower hierarchical level representative of the set of lower FRUs included in the upper FRU; and
    determines that none of the set of lower FRUs included in the upper FRU are currently being used by the router to facilitate the network traffic within the network.

14. The router of claim 13, wherein the power-optimization unit shuts off, in response to determining that none of the set of lower FRUs are currently being used by the router to facilitate the network traffic, the upper hierarchical level and the lower hierarchical level within the hierarchy of FRUs such that the upper FRU and the set of lower FRUs no longer consume electrical power in connection with the router.

15. The router of claim 11, further comprising a notification unit that issues, for presentation to a user of the router, a notification indicating that the set of physical communication ports and the PIC have been shut off due at least in part to the set of physical communication ports not being used by the router to facilitate the network traffic within the network.

16. The router of claim 11, wherein:
the set of FRUs comprises a Flexible PIC Concentrator (FPC); and
the power-optimization unit:
    determines that no PICs are currently connected to the FPC; and
    shuts off the FPC in response to determining that no PICs are currently connected to the FPC.

17. The router of claim 11, wherein:
the set of FRUs comprises a Flexible PIC Concentrator (FPC); and
the power-optimization unit:
    determines that the PIC is connected to the FPC; and
    shuts off the PIC in response to determining that the physical communication ports included on the PIC are not currently being used by the router to facilitate the network traffic within the network.

18. The router of claim 17, wherein the power-optimization unit further:
    determines that no fiber optic cables are currently connected to the communication ports included on the PIC; and
    determines, due at least in part to no fiber optic cables currently being connected to the physical communication ports included on the PIC, that the physical communication ports included on the PIC are not currently being used by the router.

19. The router of claim 17, wherein the power-optimization unit further:

determines that no network traffic is travelling on any fiber optic cables connected to the communication ports included on the PIC; and determines, due at least in part to no network traffic travelling on any fiber optic cables connected to the physical communication ports included on the PIC, that the physical communication ports included on the PIC are not currently being used by the router.

20. A method comprising:

identifying a set of physical router components that are consuming electrical power in connection with a router that facilitates network traffic within a network;

identifying a hierarchy of the physical router components that comprises:
   an upper hierarchical level that represents a Physical Interface Card (PIC); and
   a lower hierarchical level that represents a set of physical communication ports included on the PIC; and determining that none of the set of physical communication ports included on the PIC are currently being used by the router to facilitate the network traffic within the network; and shutting off, in response to determining that none of the set of physical communication ports are currently being used by the router to facilitate the network traffic, the set of physical communication ports and the PIC such that the set of physical communication ports and the PIC no longer consume electrical power in connection with the router.

* * * * *